United States Patent [19]

Custin

[11] Patent Number: 4,884,339
[45] Date of Patent: Dec. 5, 1989

[54] SHIELDED CABLE CUTTER WITH IMPROVED CABLE CLAMP

[75] Inventor: James R. Custin, Elm Grove, Wis.

[73] Assignee: GB Electrical, Inc., Milwaukee, Wis.

[21] Appl. No.: 243,516

[22] Filed: Sep. 12, 1988

[51] Int. Cl.⁴ ............................................. B21F 13/00
[52] U.S. Cl. ......................................... 30/90.4; 30/90.3
[58] Field of Search ...................... 30/90.1, 90.3, 90.4; 269/231, 235

[56] References Cited

U.S. PATENT DOCUMENTS

| 3,568,314 | 3/1971 | Adams | 30/90.4 |
| 3,851,387 | 12/1974 | Ducret | 30/90.3 |
| 4,142,290 | 3/1979 | Ducret | 30/90.3 |
| 4,697,343 | 10/1987 | Collins | 30/90.4 |

Primary Examiner—Frank T. Yost
Assistant Examiner—Willmon Fridie, Jr.
Attorney, Agent, or Firm—James E. Nilles; James R. Custin

[57] ABSTRACT

The armored cable cutter of the invention has an elongated saw carrier on which a circular saw blade is rotatable, hinged to an elongated cable carrier of U-shaped cross-section that defines a laterally opening cable receiving groove. A clamping member on the blade carrier, swingable about a trunnion axis parallel to the blade axis, has cable engaging surface portions disposed along a segment of a spiral about the trunnion axis to be at progressively increasing distances from that axis, the surface portions being configured symmetrically to the blade plane and for straddling engagement with a cable in the carrier groove. The clamping member, when swung into engagement with a cable in the groove, clamps it against one wall of the cable carrier and confines it with its diametral plane coinciding with the blade plane.

7 Claims, 2 Drawing Sheets

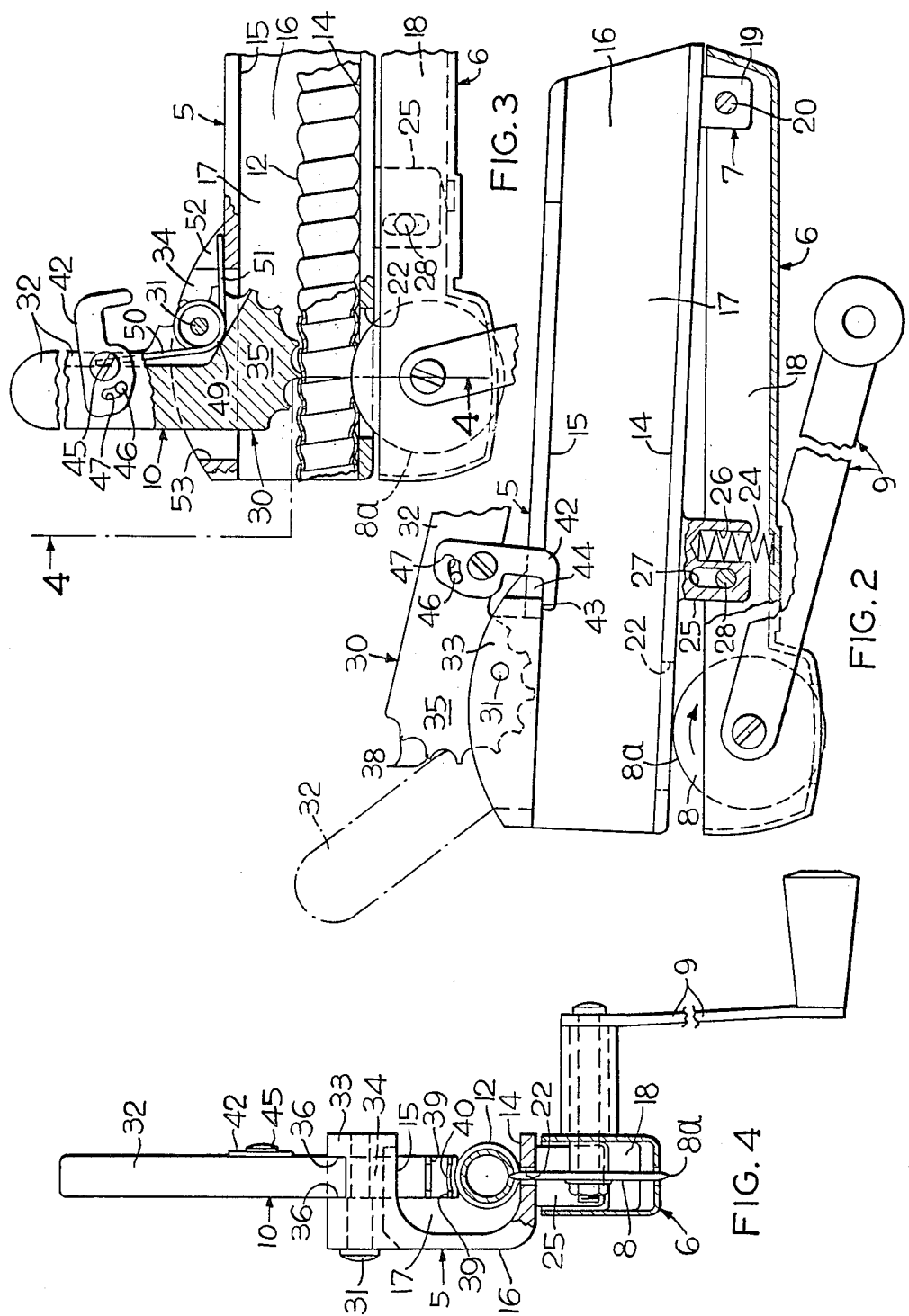

SHIELDED CABLE CUTTER WITH IMPROVED CABLE CLAMP

FIELD OF THE INVENTION

This invention relates to devices for cutting the helically wound metal shielding of shielded cable and is more particularly concerned with a shielded cable cutter having an improved clamp for holding the cable during cutting, whereby securement and release of cable of any usual diameter can be accomplished with simple operations that are performed in an instant and without need for making any adjustment.

BACKGROUND OF THE PRIOR ART

Shielded cable, also known as armored cable and BX, consists of a helically wound strip of metal that provides a relatively flexible duct in which conductor wires are protectively enclosed. For cutting such material to a desired length, a saw cut must be made through the helical strip, in a direction substantially lengthwise of the cable and having a length at least equal to the width of that strip.

Although a hack saw is a commonly used tool for cutting shielded cable, it is not well suited for the purpose because the cable must be rather sharply flexed at the cutting zone and the hack saw blade must be applied to a surface on the cable that curves away from the blade edge in all directions and thus encourages the saw to slip off of the cable and possibly injure the person performing the operation. In addition, the depth of a cut through the shielding should be carefully controlled to avoid damage to insulation on the conductors inside it, but there is no reliable way to gage the depth to which a hack saw blade has penetrated the shielding.

With these considerations in mind, a number of devices for cutting shielded cable have heretofore been proposed, intended to afford safety both for the user and for the insulation on the conductors. Most such devices have comprised a circular saw blade that was rotated by means of a hand crank or the like, cooperating with a cable supporting means whereby the shielded cable was secured in such relation to the saw blade that the latter could penetrate the shielding to only a limited depth.

U.S. Pat. No. 2,654,941 discloses such a device wherein the cable supporting means comprises two elongated lengthwise spaced apart cradle sections, one to underlie the cable and support it, the other to overlie the cable and steady it. The cable is maneuvered between the two cradle sections and then swung into engagement with them. Under some conditions a shielded cable could probably be attached to this device, cut and removed from it with commendable speed and facility. However, the cable is not positively clamped to the device, and the flexing of a free length of shielded cable is difficult to control, so that there are situations in which the cable would control the position and orientation of the cutting device, rather than being controlled by it, and the cutting operation would therefore be awkward. A further and very important disadvantage of this device is that it can be used with shielded cable of only one diameter.

U.S. Pat. No. 2,674,027 discloses a device wherein the shielded cable to be cut must be slid lengthwise in an elongated substantially tubular holder to bring it to a position at which a cut is to be made in it, and the cable is clamped at that position by means of a thumb screw threaded into the holder transversely to its length. The device is obviously inconvenient to use when a cut must be made at a location some distance from each end of a long piece of cable.

U.S. Pat. No. 3,453,917 discloses a device which is intended to be mounted on a workbench or the like and which therefore presents the inconvenience that, for every cut, the cable must be moved to the workbench or the workbench moved to the cable. The cable is clamped to the device by means of a thumb screw, so that securement and release of the cable are not convenient operations.

U.S. Pat. No. 3,633,275 discloses a device comprising hinged clamping jaws for confining the cable and a rotary cutter hinged to one of the jaws. The operator grips the jaws with one hand to exert manual clamping force upon the cable while attending to actuation of the rotary cutting blade with the other hand. Confinement and release of the cable can be effected rather quickly with this arrangement, but the security with which the cable is locked to the device is dependent upon the strength of the operator's one hand. Use of this device can therefore be fatiguing, especially where several cuts must be made in rather rapid succession. Furthermore, the clamping holder is inherently suited only for larger diameter shielded cables; to adapt it for smaller diameter cables a small spacer must be fastened to one of the clamping jaws by means of a thumb screw. Installation of such a spacer is in itself time consuming and inconvenient, and because it is a relatively small part it can be easily lost or misplaced. Another important disadvantage of this device is that the saw blade is biased towards the cable by means of a spring that exerts a predetermined force which the user cannot vary during the course of a cut and which may be too great under some circumstances and too small at other times.

U.S. Pat. No. 3,633,275 discloses a cable cutter comprising a pair of elongated handle members, each having a free end and a hinge end. They are hingedly connected at their hinge ends for limited swinging towards and from side-by-side relationship. A crank-operated rotary cutter is mounted near the free end of one of these handle members. A cable to be cut is lengthwise confined in the other one, which constitutes a cable carrier. The user operates the crank with one hand while holding the handle members in his other hand and squeezing them towards one another with a pressure that determines the cutting feed force of the cutter against the cable. This arrangement ensures that the actual cutting will take place smoothly, easily and quickly; but the device as disclosed does not offer optimum convenience. U.S Pat. No. 3,851,387 discloses a generally similar cable cutter wherein the cable carrier is in the form of a trough that is open at one side, for lateral insertion of the cable to be cut, and the cable is clamped in place by means of a thumb screw threaded into the cable carrier near its free end. The thumb screw has the disadvantage that it must be tightened into secure clamping engagement with the cable for a cutting operation, and then loosened afterward. These manipulations take time and require a certain amount of strength.

Indeed, in his later U.S. Pat. No. 4,359,819 the patentee of No. 3,851,387 says that "the use of a thumb screw for that purpose [holding the cable] is sometimes rather awkward and inconvenient". In place of the thumb screw, No. 4,359,819 discloses a clamping lever that is pivoted to the cable carrier along its side remote from the handle member on which the cutter is mounted. A spur-like plunger on this lever projects into the cable carrier for engaging the cable, clamping it with a force that depends upon the squeeze applied to the lever. As the patent says: "The manual compressive force which thus grips the cable firmly in the handle member ... also presses the saw blade ... against the cable surface ...." One disadvantage of this is that the clamping force applied to the cable tends to be variable and is not independent of the cutting force that the saw blade exerts against the cable. Another disadvantage is mentioned in the patent itself: "In the operation just described the cable holding power of the plunger depends somewhat on the manual strength of the operator which, in some cases, might be excessive." For minimizing these disadvantages the patent discloses certain adjustable expedients, but they complicate the structure, increase its cost and impose the need for making time consuming adjustments in more or less cut-andtry fashion for every different size of cable.

U.S. Pat. No. 4,697,343 to S. J. Collins discloses a cable cutter having a pair of elongated handle members and a rotary cutter, all arranged substantially like those in the last two patents discussed above. Cable to be cut is clamped into the cable carrier by means of a lever pivoted to it and having lobes that engage the cable. This lever swings about an axis that extends lengthwise along the cable carrier, and the several lobes have rounded tip portions at different distances from that axis. For securing a cable in the cable carrier, the lever is simply swung away from the orbit of the rotary cutter crank handle until one of the lobes clampingly engages the cable. This device is very fast and easy to use, and simple and inexpensive in construction, but its clamping lever, in projecting laterally from its handle members, presents inconveniences with respect to tool box storage and packaging for retail sale. There is also some possibility that a cable to be cut will not be securely clamped in its cable carrier, because the several clamping lobes have stepwise different radii, each being intended for cooperation with cable of a specific nominal diameter, whereas the outside diameter of any given shielded cable varies markedly from point to point along its length.

As pointed out in some of the above-discussed patents, a cable cutter of the type here under consideration is essentially a safety device intended to protect the user against the hazards inherent in using a hack saw. Since a hack saw is almost invariably available to a person who has occasion to cut shielded cable, the cost of a cable cutter must be low enough not to discourage its purchase as a supplement to the hack saw. Furthermore, a hack saw can be brought into action on a piece of shielded cable practically instantaneously. Therefore, the problem is not just to provide a cable cutter that is low in cost, functionally satisfactory and reasonably convenient in use, but to provide a cable cutter which offers the user so much speed and convenience that he has no incentive to use the hack saw instead.

In particular, the means for securing the cable in the cable cutter must be operable with extreme speed, ease and simplicity. In this respect, this securement means must adapt itself automatically to cable of any commercial diameter without the need for making any adjustment. Nevertheless, it must assuredly prevent the cable from being displaced either laterally or longitudinally by the action of the cutter upon it. With all of this, the device as a whole must be sturdy, reliable and inexpensive.

As is apparent from the foregoing discussion of the prior art, the requirement for automatically accommodating cable of different diameters has heretofore presented an especially troublesome problem. In most cases there has been no attempt to solve it, and no satisfactory solution to it has come forward. This problem is complicated by the substantial variation in outside radius from point to point along the length of every conventional shielded cable and by the need for so fixing the cable in the cable carrier that a diametrical plane through its shielding will substantially coincide with the plane of the saw blade that cuts it, irrespective of the nominal diameter of the cable.

Thus, the prior art demonstrates that each of the several problems involved in providing a satisfactory shielded cable cutter has received individual attention, but skill in the art has not heretofore been able to bring forth a satisfactory solution to all of those problems in their complex relationship to one another. This failure is not due to lack of incentive. The devices of some of the above discussed patents have achieved a degree of commercial success, from which it is evident that there is potentially a very profitable market for a shielded cable cutter that not only satisfies the obvious need for low cost, sturdiness and safety but also affords no less convenience and speed than a hack saw seems to offer.

SUMMARY OF THE INVENTION

The general object of this invention is to provide a device for cutting through the shielding on shielded cable, featuring cable securement means whereby shielded cable of any of a substantial range of nominal diameters can be instantly locked to the device or released from it with one quick, easily performed motion and whereby the cable, irrespective of its nominal diameter, is so confined in the device that a diametrical plane through its shielding substantially coincides with the plane of the saw blade that cuts it.

A more specific object of the invention is to provide a simple and inexpensive cable shielding cutter having cable securement means comprising a clamping lever which is merely swung in one direction to lock a cable to the device for cutting and swung in the opposite direction to release the cable, so that securement and release of the cable can be accomplished with the utmost speed and convenience, even by a person wearing heavy gloves, said securement means being further so arranged that the locking force under which the cable is confined against displacement tends to be increased by the displacing force that the saw blade imposes upon the cable while sawing it.

It is also an object of this invention to provide a versatile cable shielding cutter which adapts itself automatically and instantaneously to cable of the particular nominal diameter to be cut, and which also accommodates itself to substantial variations in outside radius from point to point along the length of the cable.

Another specific object of the invention is to provide a shielded cable cutter of the type that comprises a pair of elongated hingedly connected handles, one of which comprises a carrier for a saw blade and the other of which comprises a cable carrier to which shielded cable can be very quickly locked, said handles being so arranged that they can be held in one hand of the user and squeezed toward one another to provide whatever feed force is considered desirable for engaging the saw blade against the cable shielding while the other hand is used to actuate the saw blade, the cable being locked in the cable carrier under a secure clamping force which does not decrease during the cutting operation and is independent of the cutting feed force.

A further specific object of the invention is to provide a shielded cable cutter of the character described having a clamping member arranged to make straddling engagement with a shielded cable to be cut and whereby the cable, whatever its nominal diameter, is readily releasably secured in the cable carrier of the device under clamping forces that are imposed upon the cable in symmetrical relation to the plane of the saw blade, so that the cable is securely confined in a position such that the saw blade makes its cut on a diametrical plane through the cable shielding.

It is also an object of this invention to provide a shielded cable cutter which achieves all of the above stated objectives and which is nevertheless low in cost as well as being simple, sturdy and reliable and having a compactness that is advantageous for tool box storage and packaging for retail sale.

Thus the ultimate object of the present invention is to provide a cutter for shielded cable which affords safety for the user and for insulation on the conductors of shielded cable to be cut and which is so inexpensive and easy to use as to leave no reason or encouragement for the use of a hack saw.

In general, these and other objects of the invention that will appear as the description proceeds are achieved in an improved device for cutting the shielding of shielded cable, which device comprises an elongated cable carrier having a U-shaped cross-section defined by a pair of opposite side walls connected by a transverse wall and providing a groove which extends along the length of the cable carrier and into which a shielded cable can be laterally inserted, an elongated saw carrier connected with said cable carrier to extend lengthwise along it adjacent to one of its said side walls and to be laterally movable in opposite transverse directions towards and from the cable carrier, and a rotatable saw blade on the saw carrier contained in a plane that extends in said transverse directions and along the lengths of the carriers, said saw blade having an arcuate cutting edge portion adjacent to the cable carrier that is arranged for cutting during its motion in one direction of rotation and is carried into and out of said groove through a slit in said one side wall of the cable carrier by movement of the saw carrier in said transverse directions. The device of this invention has improved cable clamping means for readily releasably confining shielded cable in said groove and immobilizing it relative to the cable carrier for cutting by the saw blade. A characterizing feature of this cable clamping means resides in trunnion means on the cable carrier defining an axis which is normal to said plane, opposite said slit in said one side wall of the cable carrier and adjacent to the other side wall thereof. The cable clamping means is further characterized by a clamping member confined to rotation on said trunnion means and having cable engaging surface portions which are so disposed along a segment of a spiral about said axis that successive surface portions along said spiral segment are at increasing distances from said axis and rotation of the clamping member in one direction about said axis thus brings successive surface portions progressively nearer said one side wall for clamping a shielded cable against its inner surface; said clamping member further having its said surface portions disposed in symmetrical relation to said plane and arranged for substantially straddling engagement with the shielded cable in said groove; and said clamping member further having an actuating lever secured thereto and extending substantially radially to said axis whereby the clamping member can be manually rotated about said axis.

Other characterizing features of the invention that appear in a preferred embodiment of it are set forth below.

BRIEF DESCRIPTION OF THE DRAWINGS

In the accompanying drawings, which illustrate what is now regarded as a preferred embodiment of the invention:

FIG. 2 shows the cutting device partly in side elevation and partly in longitudinal section;

FIG. 3 is a fragmentary view generally similar to FIG. 2 but showing the device in operative association with a shielded cable being cut;

FIG. 4 is a sectional view taken on the plane of the line 4—4 in FIG. 3;

DETAILED DESCRIPTION OF PREFERRED EMBODIMENT OF THE INVENTION

Figure 1:
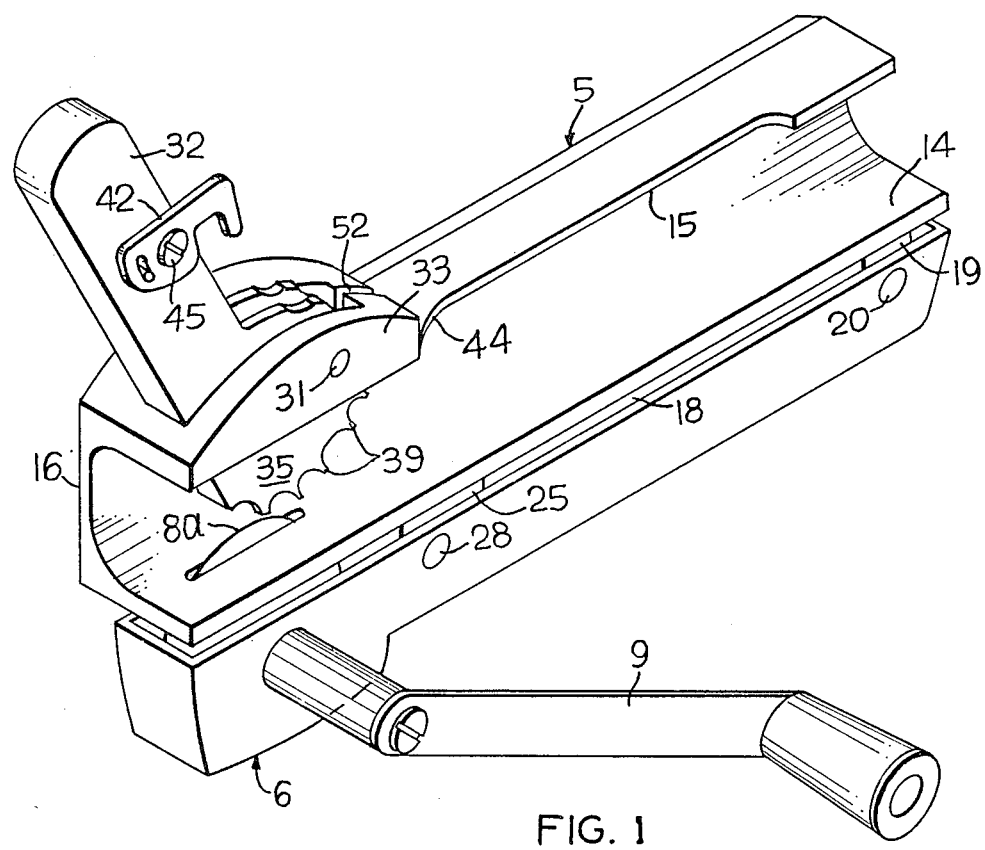
FIG. 1 is a perspective view of the cutting device of this invention.
Figure 5:
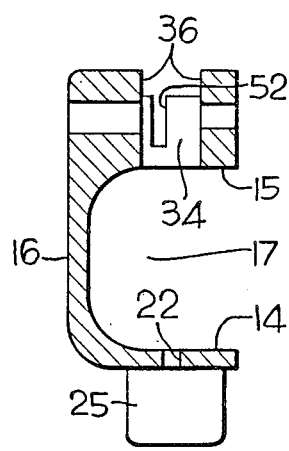
FIG. 5 is a sectional view of the cable carrier itself, taken on the plane of the axis defined by the trunnion means.

The cutting device of this invention comprises, in general, an elongated cable carrier 5, an elongated saw carrier 6, a hinge connection 7 between the two carriers, near their rear ends, a saw blade 8 that is mounted on the saw carrier near its front end, and a manual actuator 9 for moving the saw blade edgewise relative to the saw carrier. The hinge connection 7 disposes the two carriers 5, 6 in side-by-side relationship and allows them to swing through a limited distance towards and from one another. With the novel cable locking means 10 of this invention, which is mounted on the cable carrier 5 and is described hereinafter, shielded cable 12 to be cut is releasably locked to the cable carrier 5 and immobilized relative to it. The saw blade 8 can then be moved edgewise relative to the saw carrier by means of the actuator 9, and at the same time the carriers 5 and 6 are swung towards one another about the hinge connection 7 between them to advance the saw blade into the shielding of the cable 8. For this cutting operation the two carriers 5 and 6, which constitute handle members, are held in one hand and squeezed towards one another while the saw blade actuator 9 is operated with the other hand. The squeezing force that the user applies to the carriers 5, 6 determines the force under which the saw blade 8 edgewise engages the cable shielding and tends to be regulated by the force found necessary to actuate the saw blade.

The cable carrier 5 is of substantially U-shaped cross-section along most of its length, having a pair of opposite side walls 14, 15 that are connected by a transverse wall 16. The walls 14, 15, 16 cooperate to define a groove 17 which extends along the length of the cable carrier and which opens to one side of the plane of the saw blade 8 as well as to both ends of the cable carrier. The width of this groove as measured between the side walls 14, 15 is great enough so that shielded cable of the largest diameter to be cut can be inserted laterally into it.

The saw carrier 6, which overlies the side wall 14 of the cable carrier, is also of U-shaped cross-section along most of its length, but its ends are closed so that it is hollow and defines a cavity 18 which opens towards the cable carrier. Near the rear end of the cable carrier 5 is a lug 19 that projects from its side wall 14 into the cavity in the saw carrier, and a pin 20, extending through that lug and the opposite walls of the saw carrier, provides the hinge connection 7 between the two carriers 5, 6.

The saw blade 8, which is rotatably mounted on the saw carrier near its front end, has an arcuate cutting edge that is concentric to an axis which is parallel to the hinge axis defined by the pin 20. In this case the saw blade 8 is illustrated as a full circular disc, and the manual actuator 9 for it is shown as a crank by which it can be rotated, but it will be understood that the saw blade could be quadrant-shaped, for example, and could be edgewise manually reciprocated about its axis by means of a lever or the like. In any case, an arcuate cutting edge portion 8a of the saw blade projects out of the cavity 18 in the saw blade carrier to pass through a slit 22 in the side wall 14 of the cable carrier, near the front end of the latter, and thus enter the groove 17 of the cable carrier for engagement against the shielding of a cable 12 confined therein. It will be understood that the saw blade 8 is arranged to cut during its edgewise motion in one rotational direction, which direction is in this case clockwise as shown in FIG. 2 so that its cutting edge portion 8a that enters the cable carrier groove 17 moves generally towards the rear end of the cable carrier.

The carriers 5, 6 can be swung towards one another to a limit at which the front end of the saw carrier 6 abuts against the side wall 14 of the cable carrier, and at that limit the cutting edge portion 8a of the saw blade projects edgewise a predetermined distance beyond the inner surface of that side wall 14; hence the saw blade can penetrate only to a predetermined depth through the shielding of a cable 12 received in the groove 17 and confined against that side wall 14.

The carriers 5 and 6 are biased apart by means of a coiled expansion spring 24 which reacts between them. To accommodate it, the cable carrier 5 has a second lug 25 that projects into the cavity 18 in the saw blade carrier, between the hinge connection 7 and the saw blade 8 but nearer the latter, and this lug 25 has a well 26 therein that receives the spring 24. A limit of divergent motion of the carriers 5, 6 relative to one another is defined by a slot 27 through the lug 25 which is elongated in the direction of swinging motion of the carriers and through which there extends an abutment pin 28 that has its opposite ends secured to the saw blade carrier. At the outer limit of divergent motion of the carriers 5, 6, towards which they are biased by the spring 24 and which is defined by engagement of the abutment pin 28 against the outer end of its slot 27, the saw blade 8 is clear of the surface of the groove 18 in the cable carrier so that the blade does not interfere with insertion of a shielded cable laterally into that groove.

The cable clamping means 10 of this invention is mounted on the side wall 15 of the cable carrier that is remote from the saw carrier. It comprises, in general, a clamping member 30 which is rotatable about trunnion means 31 on the cable carrier and a lever 32 which extends substantially radially in relation to the trunnion means 31 and which serves as a handle whereby the clamping member can be manually actuated for such rotation.

The trunnion means 31 in this case comprises a shoulder bolt which is secured in a slotted boss 33 that projects outward from the side wall 15 of the cable carrier, that is, the boss 33 projects from that side wall in the direction away from the saw carrier 6. The slot 34 through the boss 33, in which the body portion 35 of the clamping member 30 is received, has its length parallel to the length of the cable carrier, and the trunnion means 31 bridges across it. The axis defined by the trunnion means, which is normal to the plane of the saw blade 8 and thus parallel to the saw blade axis, is spaced outwardly from the inner surface of the cable carrier side wall 15, and is preferably spaced a short distance to the rear of a line normal to that side wall that intersects the rotational axis of the saw blade.

The boss 33 that supports the trunnion means, which is preferably arcuate in outline as seen in side view (FIG. 2), extends a distance rearwardly along the cable carrier from its front end. The slot 34 through the boss has opposite flat side surfaces 36 which are parallel to the plane of the saw blade 8 and spaced equal distances to opposite sides of that plane and by which the clamping member is confined to rotation on the trunnion means.

The body portion 35 of the clamping member has opposite flat and parallel side surfaces which oppose and flatwise slidably engage the side surfaces 36 of the slot 34. The body portion 35 also has cable engaging surface portions 40 which are disposed along a segment of a spiral about the clamping member axis defined by the trunnion means 31. Thus successive surface portions 40 around the clamping member body 35 are at increasing distances from the clamping member axis. Therefore rotation of the clamping member in a clamping direction opposite to the direction of cutting rotation of the saw blade 8 brings its surface portions 40 closer and closer to the side wall 14 of the cable carrier until, at some point in that swing or rotation, the body of the clamping member is brought into firm engagement with a shielded cable of any conventional size that overlies the side wall 14. The surface portions 40 could be continuous with one another—that is, they could comprise incremental segments along an uninterrupted spiral—but preferably, as shown, the spiral is interrupted by radially outwardly opening slots or bays in the clamping member body portion 35 which define thereon tooth-like protuberances 39 upon which individual discrete surface portions 40 are formed.

Figure 6:
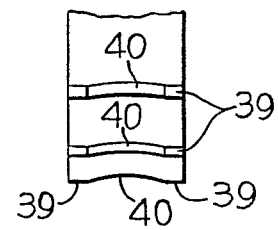
FIG. 6 is a fragmentary view of the clamping member, as seen looking in the direction towards the trunnion means axis.

Considered in directions parallel to the axis defined by the trunnion means 31 (see FIGS. 4 and 6) the cable engaging surface portions 40 are configured for substantially straddling engagement with a cable in the groove 18 of the cable carrier and are in symmetrical relation to the plane of the saw blade 8. Hence, irrespective of its diameter, a cable engaged by the clamping member body portion 35 is clamped against the cable carrier side wall 14 and is confined in a position to be cut on its diametral plane by the saw blade 8.

As the saw blade 8 is rotated against the cable shielding during cutting, the cutting force that it exerts tends to shift the cable lengthwise rearward in the cable carrier 5. However, any such rearward shift will be transferred to the clamping member 30 by reason of its engagement with the cable, swinging the clamping member in its clamping direction so that it tightens its grip on the cable. Any such rearward shifting of the cable will thus be self-limiting.

In an open or releasing position of the clamping member 30 (shown in full lines in FIG. 2), its lever or handle 32 extends generally rearwardly and overlies the outer surface of the cable carrier side wall 15, and no part of clamping member body portion 35 projects inwardly beyond the inner surface of that side wall to interfere with lateral insertion of a cable into the groove 17 in the cable carrier. A cable inserted into that groove is clamped for cutting by simply swinging the lever 32 forwardly and away from the side wall 15 until the clamping member has secure engagement with the cable.

Since the lever 32 swings in a plane which is parallel to the orbit of the manual crank actuator 9 and is well spaced from that orbit, the lever at no time interferes with operation of that actuator. Furthermore, when the clamping member is out of its open position and is engaged with a cable, the lever is in a position wherein it is swung away from the cable carrier 5, and therefore it does not interfere with the operator's squeezing grip of the carriers 5 and 6 whereby cutting feed force is applied to the saw blade.

Preferably the device has latching means for readily releasably confining the clamping member 30 in its open position, so that it does not rotate away from that position while the device is manipulated for insertion of a cable into its groove 17. The latching means can be of any suitable type that comprises cooperating elements on the clamping member 30 and the cable carrier 5, comprising for example a detent connection, a friction connection or a slidable tongue receivable in a notch, but as here shown it comprises a latching hook 42 that is mounted on the lever 32 near the front end of it for limited swinging movement relative to the lever into and out of engagement under a ledge 43 on the cable carrier. The ledge 43 is defined by a bay or cutout 44 in the side wall 15 of the cable carrier, just behind the boss 33, and the hook 42 engages against the inner surface of that side wall. Swinging motion of the hook about its pivot connection 45 with the lever is limited by a small stud 46 that is fixed in the lever and received in a short arcuate slot 47 in the shank of the hook. Since the latching means, when engaged, holds the lever 32 closely adjacent to the side wall 15 of the cable carrier, the device is then in a desirably compact condition for packaging, retail display and tool box storage.

If desired, a spring 49 can be arranged to react between the cable carrier and the clamping member to bias the latter for rotation in its clamping direction. As shown, the spring 49 is a torsion spring that has a coil surrounding the trunnion means 31, has one arm 50 received in a narrow lengthwise extending groove in the underside of the lever 32, and has its other arm 51 received in a narrow groove 52 in the boss 33 that extends rearward from the slot 34 therein. The slot 34, in which the body portion of the clamping member is received, has its front end spaced behind the front end of the side wall 15 to define a rearwardly facing abutment 53 at the front of that slot against which the lever 32 engages at a limit of the rotation for which the spring 49 biases the clamping member. It will be apparent that the latching means 42, 43 holds the clamping member in its open position against the bias of the spring 49, and that when a cable is received in the groove 17 mere release of the latching means permits the clamping member to effect an automatic clamping of the cable in response to the bias of the spring 49. After the cable has been cut, it is released from the cable carrier by merely swinging the lever 32 all the way to the rear and re-engaging the latching means 42, 43.

From the foregoing description taken with the accompanying drawings, it will be apparent that this invention provides inexpensive, sturdy and very efficient means for clamping shielded cable into a shielded cable cutter of the character described, said clamping means being arranged to adapt itself automatically to cable of the diameter to be cut and to lock the cable into a position in which a diametral plane through its shielding substantially coincides with the plane of the saw blade of the cutter. Thus a shielded cable cutter embodying the invention can be used with such convenience, facility and reliability that it leaves no reason or temptation for the use of a hack saw.

What is claimed as the invention is:

1. A device for cutting through the shielding of a shielded cable, comprising a saw blade contained in a plane and having a cutting edge portion; a saw carrier on which the saw blade is confined to edgewise motion; an elongated cable carrier of U-shaped cross-section defining an elongated groove extending along the length of the cable carrier and into which a shielded cable is laterally insertable, said cable carrier having an elongated transverse wall connecting a pair of elongated side walls that have inner surfaces facing one another across said groove; means providing a connection between said carriers that disposes them with said plane parallel to the length of the cable carrier and substantially normal to said inner surfaces and confines the carriers to motion towards and from one another transversely to the length of the cable carrier and parallel to said plane whereby said cutting edge portion of the saw blade is carried into and out of said groove through a lengthwise extending slit in one of said side walls; and cable clamping means for readily releasably confining shielded cable in said groove for cutting by the saw blade, comprising trunnion means on the cable carrier defining a clamping axis, a clamping member confined to rotation on said trunnion means and having cable engaging surface portions which are disposed along a segment of a spiral about said axis to be at increasing distances from said axis so that rotation of the clamping member about said axis brings successive surface portions progressively nearer said one side wall for clamping a shielded cable against its inner surface, and an actuating lever secured to said clamping member and extending substantially radially to said axis whereby the clamping member can be manually rotated about said axis, said cable clamping means of said device being characterized by:
  A. said trunnion means being so mounted on the cable carrier that said clamping member axis
    (1) is opposite said slit in said one side wall,
    (2) is spaced outwardly from the inner surface of the other side wall, and
    (3) extends normal to said plane; and
  B. said cable engaging surface portions on said clamping member being configured
    (1) to be in symmetrical relation to said plane and
    (2) for straddling engagement with a cable in said groove.

2. The device of claim 1 wherein said clamping member has a defined position in which said lever outwardly overlies said other side wall of the cable carrier to be adjacent to the same along its length, further characterized by:

said clamping member having its said surface portions so arranged that in its said position (1) the clamping member is disposed substantially entirely in outwardly spaced relation to the inner surface of said other side wall, to be out of said groove, and (2) successive surface portions around said spiral segment are at stepwise increasing distances from said one side wall as well as from said axis.

3. The device of claim 2, further characterized by:

cooperating means on said clamping member and on said cable carrier for readily releasably confining the clamping member in its said position.

4. A device for cutting the shielding of a shielded cable, comprising an elongated cable carrier having a U-shape cross-section defined by a pair of opposite side walls connected by a transverse wall and providing a groove which extends along the length of the cable carrier and into which a shielded cable can be laterally inserted; an elongated saw carrier connected with said cable carrier to extend lengthwise along it adjacent to one of said side walls and to be laterally movable in opposite transverse directions towards and from the cable carrier; a saw blade on said saw carrier rotatable about a blade axis and contained in a blade plane that extends in said transverse directions and along the lengths of the carriers, said saw blade having an arcuate cutting edge portion adjacent to the cable carrier that is arranged for cutting inn one direction of blade rotation and is carried into and out of said groove through a slit in said one side wall of the cable carrier by movement of the saw carrier in said transverse directions; and cable clamping means whereby shielded cable can be readily releasably confined in said groove in the cable carrier for cutting by the saw blade, comprising trunnion means on the cable carrier defining a trunnion axis, a clamping member confined by said trunnion member to rotation about said trunnion axis and having thereon a plurality of surface portions which face substantially radially away from said trunnion axis and are disposed along a segment of a spiral about said trunnion axis to be at increasing distances from that axis such that rotation of the clamping member in a clamping direction brings successive ones of said surface portions into opposing relationship to said one side wall at progressively decreasing distances therefrom, and means connected with said clamping member for manually rotating the same about said trunnion axis, said cable clamping means of said device being characterized by:

A. said trunnion means being so mounted on the cable carrier that said trunnion axis (1) is parallel to said blade axis and (2) is substantially opposite said slit in said one side wall of the cable carrier and adjacent to the other side wall thereof;

B. said surface portions on said clamping member being configured (1) in symmetrical relationship to said blade plane and (2) for straddling engagement with a cable in said groove so as to confine the cable against lateral motion relation to the cable carrier while clamping the cable against said one side wall; and C. said clamping direction of clamping member rotation being opposite to said direction of blade rotation.

5. The device of claim 4 wherein said means for rotating said clamping member comprises a lever projecting substantially radially from said trunnion axis and manually swingable for rotating the clamping member.

6. The device of claim 5 wherein each of said side walls has an inner surface facing into said groove and an outer surface facing away from said groove, further characterized in that:

(1) said trunnion axis is spaced outwardly from the inner surface of said other side wall; and (2) said clamping member has a predetermined position of its rotation wherein (a) said clamping member is disposed substantially entirely in outwardly spaced relation to the inner surface of said other side wall and (b) said lever overlies the outer surface of said other side wall to be adjacent thereto along its length.

7. The device of claim 6, further characterized by:

cooperating means on said other side wall and on said clamping member for readily releasably confining the latter in its said predetermined position.

* * * * *